UNITED STATES PATENT OFFICE.

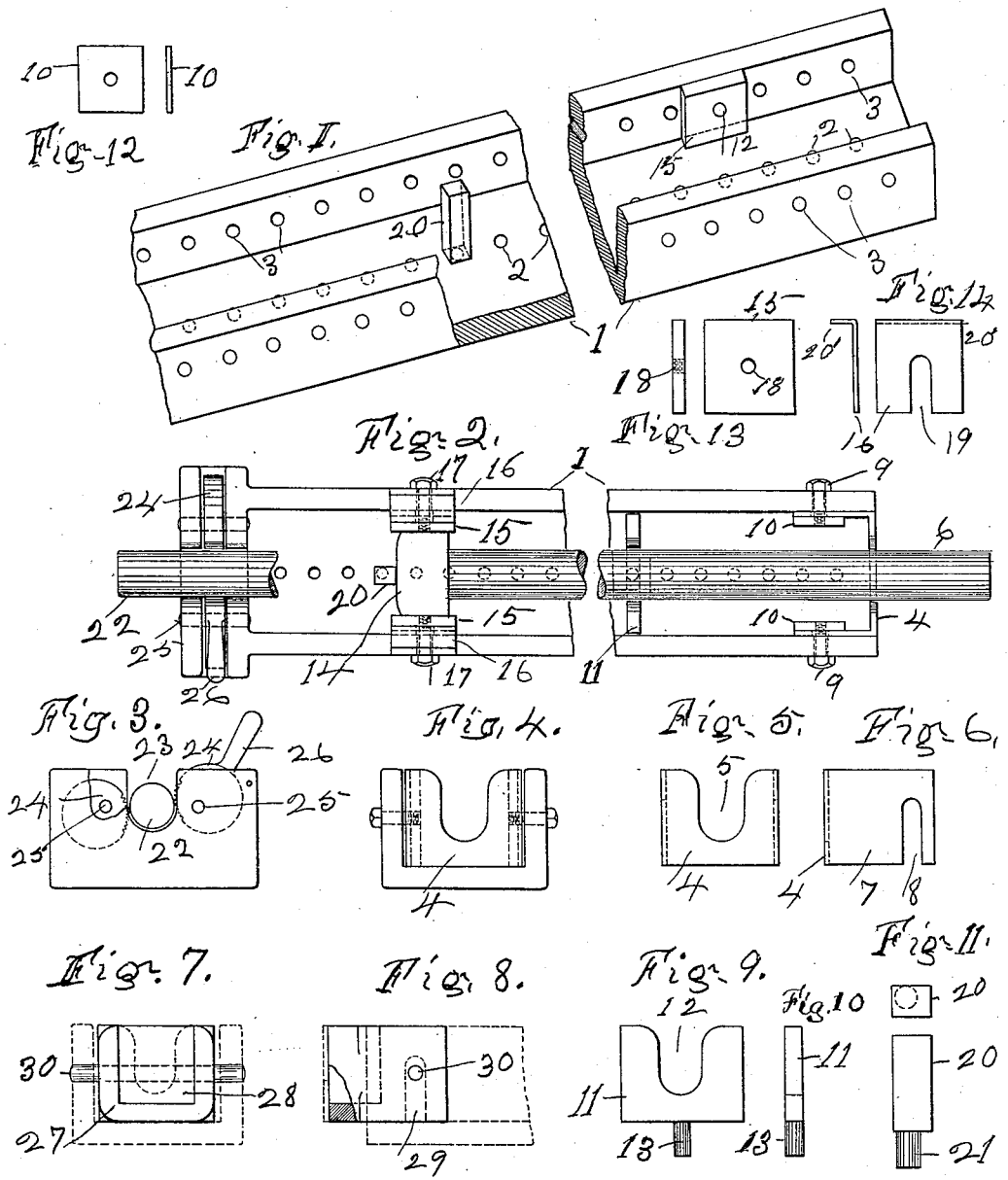

PETER F. SCHENK, OF FORT WAYNE, INDIANA.

BOLT-CLAMPING DEVICE.

1,050,301. Specification of Letters Patent. Patented Jan. 14, 1913.

Application filed November 22, 1911. Serial No. 661,684.

*To all whom it may concern:*

Be it known that I, PETER F. SCHENK, a citizen of the United States, residing at Fort Wayne, in the county of Allen, in the State of Indiana, have invented certain new and useful Improvements in Bolt-Clamping Devices; and I do hereby declare that the following is a full, clear, and exact description of the invention, which will enable others skilled in the art to which it appertains to make and use the same, reference being had to the accompanying drawings, which form part of this specification.

My invention relates to improvements in bolt clamping devices.

It is well known that some means must be provided for firmly holding a bolt in position against any rotary movement during the operation of the thread cutting die thereon and that such means now in use requires two adjustments for each operation of the die, viz: an adjustment of the bolt holding or gripping means to seize or grip the bolt, and an adjustment to release the bolt after the operation to permit its removal. As an ordinary workman with the present means can thread about fifteen hundred bolts per day, he thus in so doing makes about three thousand adjustments of the bolt holding mechanism per day.

The primary object of my present invention is to provide a cheap, simple, convenient and reliable bolt holding device requiring no adjustments in use, except where the size of the bolt operated upon is changed, and also adapted to secure with equal facility an iron rod without a head while cutting a thread thereon.

My invention consists of a hollow casing open at its top and forward end, having its sides and bottom provided with a series of spaced perforations, and having its rear end provided with eccentric gripping means; means for securing the bolt against both the rotary impulse and the longitudinal thrust of the die; and means for securing different sizes of bolts in any desired longitudinal adjustment.

The principal novel feature of my invention resides in the generic means for firmly holding a bolt during the operation of the thread cutting die thereon without the necessity of adjusting the same either before or after such operation, the specific means being capable of various modifications in their details of construction.

In the accompanying drawings Figure 1 is a fragmentary perspective view of the casing with the stop pin and one of the removable side plates in position therein. Fig. 2 is a plan view of my invention partly broken away showing a bolt in position and the means for securing the same against rotary movement or longitudinal derangement, and also showing the manner of securing a headless rod therein for the thread cutting operation. Fig. 3 is an end view of Fig. 2 looking from the left, and showing the action of the gripping means thereon. Fig. 4 is an end view of Fig. 2 looking from the right showing the rod supporting plate in position. Fig. 5 is a detail of the last mentioned plate. Fig. 6 is a side view of the same. Fig. 7 is a front view of the means for securing the head of a short bolt. Fig. 8 is a side view of the same showing how it projects beyond the end of the casing where a very short bolt is presented to the die. Fig. 9 is a side view of the removable plate which supports the rod or a long bolt near the middle of the casing, and Fig. 10 is an edge view of the same. Fig. 11 is a detailed plan and side view respectively of the stop pin shown in Fig. 1. Fig. 12 is a side and edge view respectively of the nuts employed to secure the forward bolt-supporting plate. Fig. 13 is an edge and side view of the bolt head gripping plates. Fig. 14 shows two views of a washer employed.

The body or casing 1 of any proper dimensions and contour, preferably of metal and rectangular, is open at the top and forward end and has its bottom and sides provided with a series of measured perforations 2 and 3 and has its rear end provided with a pair of gripping devices for the special purpose hereafter described.

In the forward end of the casing is removably mounted the plate 4 having a central vertical recess 5 to receive the forward end of the bolt 6, Fig. 2, and has the lateral parallel wings 7 which have a vertical slot 8 to receive the respective bolts 9 provided upon their inner ends with the nuts 10. By this construction the plate 4 can readily be placed in position or removed therefrom without removing the bolts 9. The obvious function of plate 4 is to support the forward end of the bolt 6 and to prevent lateral displacement thereof during the thread cutting operation.

A second plate 11, Figs. 9 and 10, has a central vertical recess 12 to snugly receive the bolt 6, and has upon its lower edge a pendant pin 13 adapted to snugly fit any one of the openings 2 in the casing 1 by which it is firmly held in position as shown in Fig. 2.

The angular head 14 of the bolt 6 is firmly held against rotary movement or lateral displacement by means of the plates 15 and 16, Figs. 13 and 14, arranged as follows, and shown in Fig. 2: The plates 15 are placed adjacent to two opposite faces of the bolt-head 14 and firmly secured in such position by means of the respective bolts 17 whose inner ends engage the centrally arranged screw-threaded opening 18 therein. Where the bolt-head is comparatively small, and a space is thus left between the plates 15 and the walls of the casing such space is filled up by inserting one or more of the washer plates 16 therein. This is done by slipping the washer over the bolts 17 until the bolt rests in the upper closed end of the slot 19 therein, with the overlapping flange 20′ turned outwardly, as shown in Fig. 2.

The bolt 6 is firmly secured against longitudinal displacement by means of the pin 20 having upon its lower end a pendant circular lug 21 which fits the openings 2. This pin is preferably angular in cross-section and eccentric to the lug 21, whereby a slight longitudinal adjustment of the bolt 6 can readily be secured, when desired, by a quarter turn of the said pin.

When it is desired to thread a round-headed bolt or a rod 22, the plates 4 and 11 are left in position, and the forward end of the rod which is presented to the die, is placed in the vertical recess 23, Fig. 3. An eccentric 24 is pivotally mounted on the pin 25 in such relation thereto that it will by its gravity when at rest extend somewhat into the recess 23 and thereby present a serrated engaging edge to the rod when placed therein. A second eccentric 24 is revolubly mounted on the pin 25′ with its notched perimeter normally clear of the recess 23, and having a handle 26 by which the operator throws it into engagement with the rod 22 when in position. As the die always tends to rotate the rod to the right in cutting the thread, it is obvious that such rotary strain will instantly tighten the rod firmly in the grip of the coacting eccentric. Evidently in threading a round-headed bolt or rod the position of the casing 1 relatively to the die will be reversed, end for end.

It is obvious that in the use of my invention the clamping plates 15 and 16 can be employed as described, conjointly with the said coacting eccentrics in the threading of an angular headed bolt when desired.

When it is desired to thread a very short bolt a special means for securing the bolt-head is employed, consisting of an angular block 27 having an angular vertical recess 28 therein to snugly receive the bolt head, and a transverse recess 29 near its rear face extending upwardly from the bottom, and adapted to receive a pin 30 whose ends are fixed in the openings 3. This block when in position preferably projects slightly beyond the forward end of the casing as shown in Fig. 8 to give the bolt a full presentation to the die.

Obviously the support 4 can and should be used with the block 27, in which case the pin 30 secures the same instead of the bolts 9, as shown in Fig. 7.

The manner of employing my invention thus described is obvious and briefly stated is as follows: When the operator desires to thread a certain number of bolts of a uniform size he fixes the casing 1 on a suitable support in proper relation to the cutting die with the supporting plates 4 and 11 in position as shown in Fig. 2. He then places the first bolt in position on these plates with one end projecting a proper distance beyond the plates 4 to be acted upon by the die. The plates 15 and the washers 16 are then placed in position to secure the head of the bolt against rotation, and the pin 20 is then adjusted in the proper opening 2. After the bolt has been threaded it can readily be lifted out and another one placed in position so long as the bolts are of the same size. When it is desired to thread either a longer or shorter bolt, the only adjustment necessary is that of the bolt-head securing plates, and to thread a very short bolt the operator simply moves the plate 4 forward one hole, substitutes the pin 30 for the bolts 9, and places the block 27 in position. While the form of the pin 20 is not material to my invention, it is the preferred form that is shown. The only change necessary for threading a round-headed bolt or a rod, is to present the rear end of the casing to the threading-die and place the rod or bolt in position between the gripping eccentrics, as shown in Fig. 3.

Having thus described my invention and the manner of employing the same what I desire to secure by Letters Patent is:

1. In a bolt clamping device a bolt containing casing provided at its opposite sides with registering apertures; a pair of peripherally notched eccentrics pivotally mounted in one end of the casing and adapted to automatically grip an interposed bolt by their gravity; and adjustable means for laterally clamping the bolt head in the casing to prevent rotation thereof.

2. A bolt clamping device consisting of a containing casing open at its upper face; means for supporting the bolt in position in the casing; and means for clamping the head of the bolt laterally whereby it can be placed in position or removed therefrom without any adjustment of the said clamping means.

Signed by me at Fort Wayne, Allen county, State of Indiana, this 20" day of November, 1911.

PETER F. SCHENK.

Witnesses:
J. J. FREISTROFFER,
F. B. FEDERSPIEL.

Copies of this patent may be obtained for five cents each, by addressing the "Commissioner of Patents, Washington, D. C."